(12) United States Patent
Masui (10) Patent No.: US 8,808,935 B2
(45) Date of Patent: Aug. 19, 2014

(54) FUEL CELL SYSTEM

(75) Inventor: Takatoshi Masui, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1189 days.

(21) Appl. No.: 12/438,552

(22) PCT Filed: Aug. 28, 2007

(86) PCT No.: PCT/IB2007/002463
§ 371 (c)(1),
(2), (4) Date: Feb. 24, 2009

(87) PCT Pub. No.: WO2008/029233
PCT Pub. Date: Mar. 13, 2008

(65) Prior Publication Data
US 2009/0263691 A1      Oct. 22, 2009

(30) Foreign Application Priority Data

Aug. 31, 2006  (JP) ................. 2006-234828

(51) Int. Cl.
*H01M 8/04*      (2006.01)

(52) U.S. Cl.
USPC .......................... 429/428; 429/443

(58) Field of Classification Search
USPC ....................................... 429/428
See application file for complete search history.

(56) References Cited

U.S. PATENT DOCUMENTS

| | | |
|---|---|---|
| 6,451,465 B1 | 9/2002 | Chalfant et al. |
| 2001/0016275 A1 | 8/2001 | Takamura |
| 2002/0031450 A1 | 3/2002 | Yamashita et al. |
| 2002/0182460 A1* | 12/2002 | Okamoto ................ 429/23 |
| 2003/0012990 A1 | 1/2003 | Yamanashi |

FOREIGN PATENT DOCUMENTS

| | | |
|---|---|---|
| EP | 0 973 220 | 1/2000 |
| EP | 1 122 805 | 8/2001 |
| EP | 1 261 054 | 11/2002 |
| JP | 63-029460 A | 2/1988 |
| JP | 08-078030 A | 3/1996 |
| JP | 09-007618 A | 1/1997 |
| JP | 9 63619 | 3/1997 |
| JP | 9 278402 | 10/1997 |
| JP | 2000 26101 | 1/2000 |
| JP | 2000-195534 A | 7/2000 |
| JP | 2001-085039 A | 3/2001 |
| JP | 2001-226101 A | 8/2001 |

(Continued)

OTHER PUBLICATIONS

Office Action issued Feb. 14, 2012, in Japanese Patent Application No. 2006-234828, filed Aug. 31, 2006 (with English language translation).

(Continued)

*Primary Examiner* — Ula C Ruddock
*Assistant Examiner* — Jacob Marks
(74) *Attorney, Agent, or Firm* — Oblon, Spivak, McClelland, Maier & Neustadt, L.L.P.

(57) ABSTRACT

A fuel cell system including a fuel cell, a reformer, a combustor that heats the reformer using anode off-gas of the fuel cell as a fuel, and a ratio controller that controls a ratio of a combustion component supplied to the combustor in accordance with a temperature distribution in a gas flow direction inside the combustor.

18 Claims, 7 Drawing Sheets

(56) References Cited

FOREIGN PATENT DOCUMENTS

| JP | 2002-316801 A | 10/2002 |
|---|---|---|
| JP | 2003-197236 A | 7/2003 |
| JP | 2003-277016 A | 10/2003 |
| JP | 2003-297400 A | 10/2003 |
| JP | 2003-306305 A | 10/2003 |
| JP | 2003-308862 A | 10/2003 |
| JP | 2005 203194 | 7/2005 |
| JP | 2005 235583 | 9/2005 |
| JP | 2005 332725 | 12/2005 |
| JP | 2006-164962 A | 6/2006 |

OTHER PUBLICATIONS

Office Action issued Feb. 2, 2010, in Japanese Patent Application No. 2004-043421(with English language translation).

* cited by examiner

FUEL CELL SYSTEM

BACKGROUND OF THE INVENTION

1. Field of the Invention

The present invention relates to a fuel cell system having a fuel cell.

2. Description of the Related Art

A fuel cell generally generates electrical energy by using hydrogen and oxygen as fuels. Because of its superiority in terms of the environment and ability to achieve high energy efficiency, development is being widely conducted into the use of fuel cells as future energy supplying systems.

At present, in many fuel cells, a reformed gas that contains hydrogen is generated from a hydrocarbon-based fuel such as gasoline, natural gas, or methanol, using a reformer, and the generated reformed gas is supplied to an anode of the fuel cell. In the reformer, reforming is performed by, for example, a steam reforming reaction that uses steam.

Because the steam reforming reaction is an endothermic reaction, the reformer is heated to promote the reforming reaction. For this reason, fuel cell systems are developed in which heat is provided to the reformer using a combustor or the like. For example, Japanese Patent Application Publication No. JP-A-2005-235583 describes an art using anode off-gas as fuel gas for heating the reformer. According to this art, a high reforming efficiency is achieved.

However, because the ratio of methane contained in the reformed gas changes, depending upon the conditions within the reformer, the ratio of methane in the anode off-gas also changes. Because methane is difficult to combust, a temperature distribution might occur inside the reformer. As a result, the combustor may not generate sufficient heat.

SUMMARY OF THE INVENTION

The present invention provides a fuel cell system that supplies sufficient heat in a reformer.

One aspect of the present invention provides a fuel cell system having a fuel cell, a reformer, a combustor that heats the using anode off-gas of the fuel cell as a fuel, and a ratio controller that controls a ratio of a combustion component supplied to the combustor in accordance with a temperature distribution in a gas flow direction inside the combustor.

According to this aspect, combustion in the combustor is promoted. As a result, sufficient heat is provided in the reformer.

The ratio controller may increase an amount of combustion-supporting gas supplied to the combustor, if a temperature distribution width in the gas flow direction inside the combustor exceeds a prescribed value. In this case, combustion in the combustor is promoted. As a result, sufficient heat is provided in the reformer. Unnecessary control by the ratio controller may also be avoided. The ratio controller may increase an amount of combustion-supporting gas supplied to the inside of the combustor, as the temperature distribution width in the gas flow direction inside the combustor is greater. In this case, combustion in the combustor is effectively promoted. As a result, sufficient heat is effectively supplied in the reformer.

The ratio controller may increase an amount of hydrogen in the anode off-gas, if the excess oxygen ratio in the combustor exceeds a prescribed rate. Because hydrogen is easily combusted, combustion in the combustor is promoted. By doing this, sufficient heat may be provided efficiently. The temperature decrease in the combustor caused by unnecessary increase of the excess oxygen ratio in the combustor is also suppressed. The ratio controller may also increase an amount of hydrogen in the anode off-gas, as the temperature distribution width in the gas flow direction inside the combustor is greater. In this case, combustion in the combustor is effectively promoted. As a result, sufficient heat is effectively provided in the reformer.

A temperature distribution width acquisition unit that acquires the temperature distribution width in the gas flow direction inside the combustor may further be provided. In this case, the ratio controller controls the combustion component ratio based on the temperature distribution width acquired by the temperature distribution width acquisition unit. A component ratio prediction unit that predicts the component ratio in the anode off-gas based on the temperature distribution width acquired by the temperature distribution width acquisition unit may further be provided and the ratio controller may control the ratio of the combustion component based on the component ratio predicted by the component ratio prediction unit. In this case, combustion in the combustor is promoted.

The anode off-gas may include a difficult-to-combust gas, the component ratio prediction unit may predict the ratio of the difficult-to combust gas, and the ratio controller may increase the amount of combustion-supporting gas, if the ratio of the difficult-to-combust gas that is predicted by the component ratio prediction unit is equal to or exceeds a first prescribed value. In this case, combustion of the difficult-to combust gas is promoted, and unnecessary increase of the combustion-supporting gas can be suppressed. By doing this, temperature decrease in the combustor is suppressed. As a result, combustion efficiency in the combustor is improved. The ratio controller may reduce the consumed hydrogen amount of the fuel cell, if the ratio of the difficult-to-combust gas that is predicted by the component ratio prediction unit is equal to or exceeds a second prescribed value that is greater than the first predetermined value. In this case, combustion in the combustor is promoted.

A temperature acquisition unit that acquires the average temperature in the combustor, and a determining unit that determines the first prescribed value and the second prescribed value based on the average temperature that is acquired by the temperature acquisition unit may further be provided. In this case, unnecessary increase of the combustion-supporting gas can be avoided and unnecessary reduction of the consumed hydrogen amount can also be avoided in accordance with temperature in the combustor.

A combustion-supporting gas ratio acquisition unit that acquires the ratio of the anode off-gas and the combustion-supporting gas may be further provided, and the ratio controller may control the ratio of the combustion component based on the ratio of the anode off-gas and the combustion-supporting gas that is acquired by the combustion-supporting gas ratio acquisition unit. In this case, the anode off-gas is efficiently combusted. By doing this, sufficient heat is supplied in the reformer.

A minimum temperature acquisition unit that acquires a minimum temperature of the combustor, and a first determining unit that determines whether to operate the ratio controller, based on the minimum temperature acquired by the minimum temperature acquisition unit, may further be provided. Operation of the ratio controller is stopped, if the necessary heat is supplied to the reformer. By doing this, unnecessary control by the ratio controller is avoided.

A pre-reformed fuel amount acquisition unit that acquires a pre-reformed fuel amount supplied to the reformer, and a second determining unit that determines whether to operate the ratio controller, based on the pre-reformed fuel amount acquired by the pre-reformed fuel amount acquisition unit may further be provided. In this case, the ratio control unit stops operating, if the supply amount of anode off-gas is small. By doing this, unnecessary control by the ratio controller is avoided.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements, and wherein.

DETAILED DESCRIPTION OF THE EXAMPLE EMBODIMENTS

Embodiments of the present invention are described in detail below.

Figure 1:
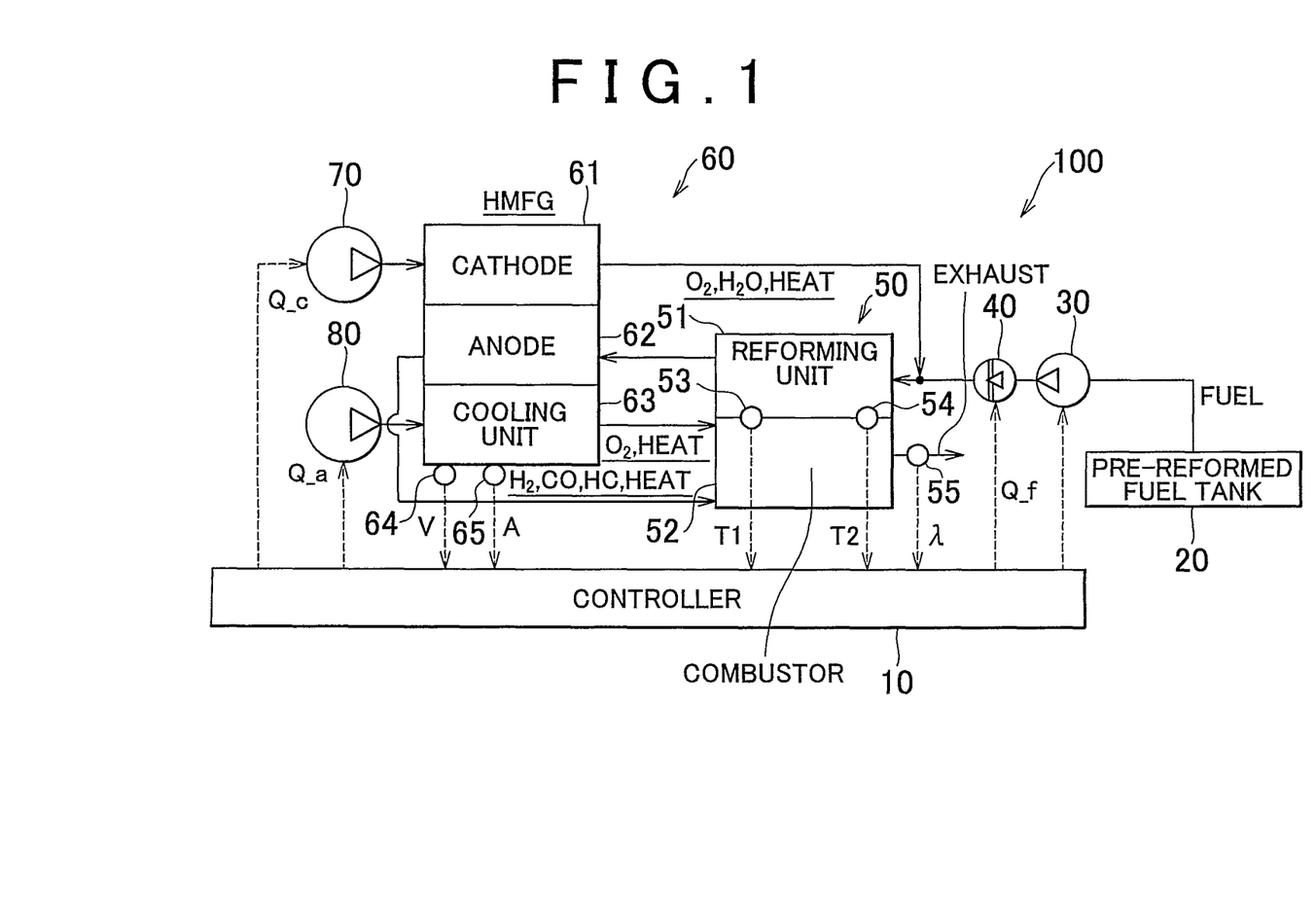
FIG. 1 is a schematic diagram of the overall configuration of a fuel cell system according to a first embodiment of the present invention.

FIG. 1 is a schematic diagram of the overall configuration of a fuel cell system 100 according to the first embodiment of the present invention. As shown in FIG. 1, the fuel cell system 100 has a controller 10, a pre-reformed fuel tank 20, a fuel pump 30, an amount-adjusting valve 40, a reformer 50, a fuel cell 60, and air pumps 70, 80.

The pre-reformed fuel tank 20 stores pre-reformed fuel that is supplied to a reforming unit 51 to be described below. This embodiment uses a hydrocarbon fuel as the pre-reformed fuel. The fuel pump 30 supplies pre-reformed fuel stored in the pre-reformed fuel tank 20 to the reforming unit 51. The amount-adjusting valve 40 adjusts the amount of pre-reformed fuel supplied to the reforming unit 51.

The reformer 50 generates, from the pre-reformed fuel, reformed gas that contains hydrogen. In addition to the reforming unit 51, the reformer 50 has a combustor 52, a first temperature sensor 53, a second temperature sensor 54, and an excess air ratio $\lambda$ sensor 55. The first temperature sensor 53 is provided upstream in the combustor 52. The second temperature sensor 54 is provided downstream in the combustor 52.

The first temperature sensor 53 may be provided in the vicinity of the catalyst inlet of the combustor 52, and the second temperature sensor 54 may be provided in the vicinity of the catalyst outlet of the combustor 52. The first temperature sensor 53 and the second temperature sensor 54 may be disposed in the catalyst of the reforming unit 51. In this case, the first temperature sensor 53 can be disposed in the catalyst of the reforming unit 51 at the inlet side of the combustor 52, and the second temperature sensor 54 can be disposed in the catalyst of the reforming unit 51 at the outlet side of the combustor 52. The air excess ratio $\lambda$ sensor 55 is provided in the exhaust system that communicates with the outside from the combustor 52. The air excess ratio $\lambda$ denotes the ratio of the amount of oxygen supplied to the combustor 52 with respect to the amount of oxygen required for complete combustion in the combustor 52.

The fuel cell 60 has a cathode 61, an anode 62, a cooling unit 63, a voltmeter 64, and an ammeter 65. The air pump 70 supplies air to the cathode 61, and the air pump 80 supplies air to the cooling unit 63. The controller 10 includes a CPU (central processing unit), a ROM (read-only memory), and a RAM (random access memory). The controller 10 controls various parts of the fuel cell system 100, based on detection results provided by the first temperature sensor 53, the second temperature sensor 54, the air excess ratio $\lambda$ sensor 55, the voltmeter 64, and the ammeter 65. The details are described later.

In this embodiment, a hydrogen separation membrane fuel cell is used as the fuel cell 60. A hydrogen separation membrane fuel cell is a fuel cell having a hydrogen separation membrane layer that is formed by a metal that is hydrogen permeable. The hydrogen separation membrane fuel cell is formed by laminations of hydrogen separation layers and proton-conductive electrolytes. The hydrogen supplied to the anode of the hydrogen separation membrane fuel cell is converted to protons via the catalyst, migrates through the proton-conductive electrolyte, and joins with oxygen to become water at the cathode. The water generated at the cathode becomes steam by the heat generated when electricity is generated by the hydrogen separation membrane fuel cell.

The general operation of the fuel cell system 100 will now be described. The fuel pump 30, in accordance with an instruction from the controller 10, supplies pre-reformed fuel stored in the pre-reformed fuel tank 20 to the amount-adjustment valve 40. The amount-adjustment valve 40, in accordance with an instruction from the controller 10, supplies pre-reformed fuel to the reforming unit 51 an amount of pre-reformed fuel required for the reforming reaction therein.

In the reforming unit 51, reformed gas that contains hydrogen is generated from pre-reformed fuel and the cathode off-gas, which will be described later. First, a steam reforming reaction occurs between methane contained in the pre-reformed fuel and steam contained in the cathode off-gas, the result being the generation of hydrogen and carbon monoxide. Next, part of the generated carbon monoxide and the steam in the cathode off-gas react to generate hydrogen and carbon dioxide. If the steam is insufficient for the steam reforming reaction, the oxygen in the cathode off-gas and the methane undergo a partial oxidation reaction to generate hydrogen and carbon monoxide.

The reformed gas generated in the reforming unit 51 is supplied to the anode 62, at which the hydrogen in the reformed gas is converted to protons. Hydrogen that is not converted to protons at the anode 62 and methane that did not reacted in the reforming unit 51 are supplied as anode off-gas to the combustor 52. Hydrogen is an easily combusted gas, and methane is a difficult-to-combust gas.

The air pump 80, in accordance with an instruction from the controller 10, supplies the required amount of air to the cooling unit 63. The air supplied to the cooling unit 63 cools the fuel cell 60 and supplied to the combustor 52. At the combustor 52, the anode off-gas and the air supplied from the cooling unit 63 cause a combustion reaction. That is, the oxygen contained in the air functions as a combustion-supporting gas, and the anode off-gas functions as a fuel. The exhaust gas generated by the combustion reaction in the combustor 52 is discharged to the outside of the fuel cell system 100. The heat of combustion in the combustion reaction in the combustor 52 is used in the steam reforming reaction in the reforming unit 51. In this embodiment, the anode off-gas and oxygen are collectively referred to as combustion component.

The first temperature sensor 53 detects the temperature at the inlet side in the gas flow direction in the combustor 52, and provides the detection result to the controller 10. The second temperature sensor 54 detects the temperature at the exhaust outlet side in the gas flow direction in the combustor 52 and provides the detection result to the controller 10. The air excess ratio λ sensor 55 detects (acquires) the air excess ratio λ in the combustor 52 from the exhaust gas discharged from the combustor 52, and provides the detection result to the controller 10. The voltmeter 64 detects the generated voltage of the fuel cell 60 and provides the detection result to the controller 10. The ammeter 65 detects the generated current of the fuel cell 60 and provides the detected result to the controller 10.

The air pump 70, in accordance with an instruction from the controller 10, supplies the required amount of oxygen to the cathode 61. At the cathode 61, both water and electrical power are generated from the protons converted at the anode 62 and the oxygen in the air supplied to the cathode 61. The generated electrical power is either stored in a storage battery or used for a load such as a motor. The generated water is converted to steam by the heat generated in the fuel cell 60. The steam generated and the air that did not react with the protons at the cathode 61 are supplied as cathode off-gas to the reforming unit 51, these being used, respectively, in the steam reforming reaction and the partial oxidation reaction.

In the case of incomplete combustion in the combustor 52, insufficient heat causes a decrease in the reforming efficiency in the reforming unit 51. For example, because methane is more difficult to combust than hydrogen, incomplete combustion of methane can result in insufficient heat. The fuel cell system 100 of this embodiment avoids insufficient heat in the reforming unit 51. Specifically, by controlling the combustion component ratio inside the combustor 52 based on the temperature distribution in the combustor 52, the fuel cell system 100 avoids insufficient heat in the reforming unit 51. This control is described below.

First, the controller 10 determines the power command value P_c, which is the amount of electrical power required in the fuel cell 60. The power command value P_c is determined, for example, from the opening of the accelerator (not illustrated) or the remaining capacity of a secondary battery. When the fuel cell system 100 is a distributed power supply, such as a household power supply, the power command value P_c may be determined from the power demand or the like at the location where the fuel cell system 100 is disposed.

Figure 2:
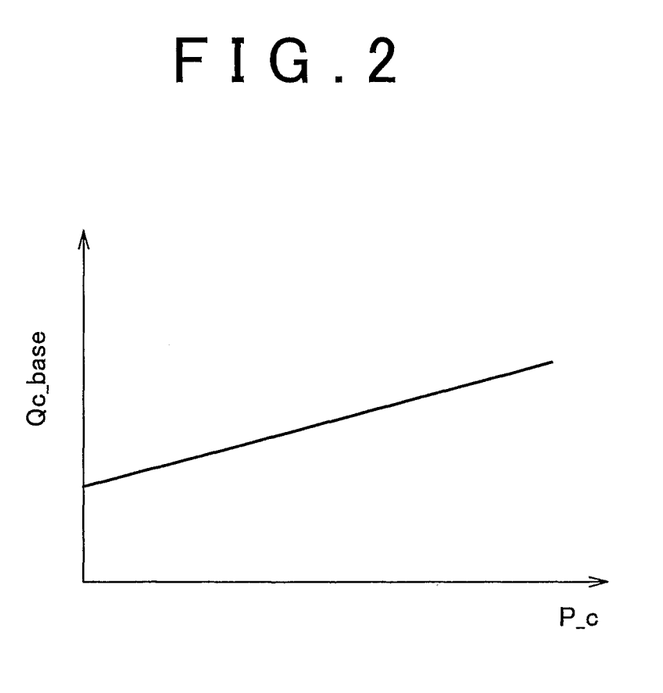
FIG. 2 is a graph showing an example of the relationship between a power command value and a required air amount.

Next, the controller 10, based on the power command value P_c determines the required air amount Qc_base, which is the amount of air to be supplied to the cathode 61 using, for example, a map such as shown in FIG. 2. FIG. 2 shows an example of the relationship between the power command value P_c and the required air amount Qc_base, in which the horizontal axis represents the power command value P_c, and the vertical axis represents the required air amount Qc_base. In FIG. 2, the required air amount Qc_base is proportional to the power command value P_c. In FIG. 2, an offset is imparted to the required air amount Qc_base because not all of the oxygen supplied the cathode 61 contributes to electrical generation.

Figure 3:
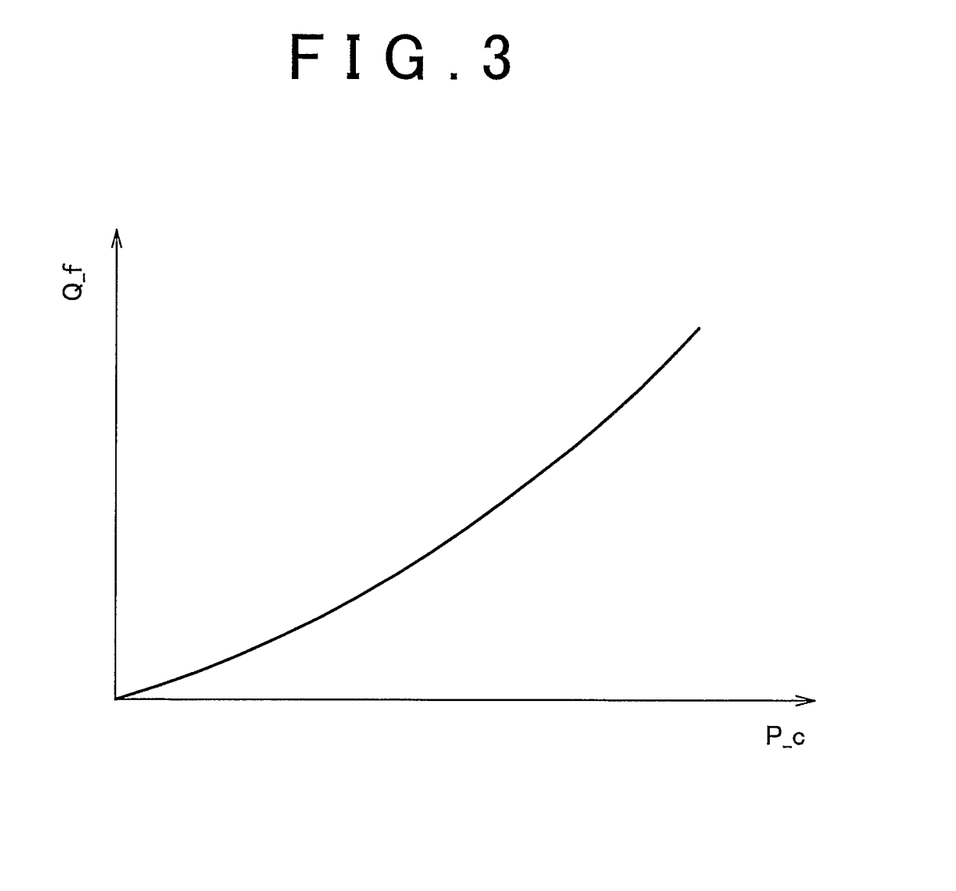
FIG. 3 is a graph showing an example of the relationship between the power command value and a required pre-reformed fuel amount.

Next, the controller 10, based on the power command value P_c, determines the required pre-reformed fuel amount Q_f, which is the pre-reformed fuel to be supplied to the reforming unit 51, using, for example, a map such as shown in FIG. 3. FIG. 3 shows an example of the relationship between the power command value P_c and the required pre-reformed fuel amount Q_f, in which the horizontal axis represents the power command value P_c and the vertical axis represents the required pre-reformed fuel amount Q_f. In FIG. 3, the required pre-reformed fuel amount Q_f increases with an increase in the power command value P_c. The rate of increase of the required pre-reformed fuel amount Q_f increases with an increase in the power command value P_c. This is because the reforming efficiency of the reforming unit 51 decreases as the amount of pre-reformed fuel increases.

Next, the controller 10 determines whether there is a large temperature distribution width in the gas flow direction inside the combustor 52. In this embodiment, the controller 10 determines that temperature distribution width in the gas flow direction in the combustor 52 is large, when the difference between the detected temperature T2 of the second temperature sensor 54 and the detected temperature T1 of the first temperature sensor 53 is larger than a prescribed value. That is, the controller 10 predicts the temperature distribution width in the combustor 52, based on the detected temperature T1 and the detected temperature T2. The temperature difference limit Td_ref, which is the maximum value allowable as the difference between the detected temperature T2 and the detected temperature T1, may be used as the threshold value in making this determination. The temperature difference limit Td_ref is, for example, the temperature difference at which incomplete combustion occurs in the combustor 52.

Figure 4:
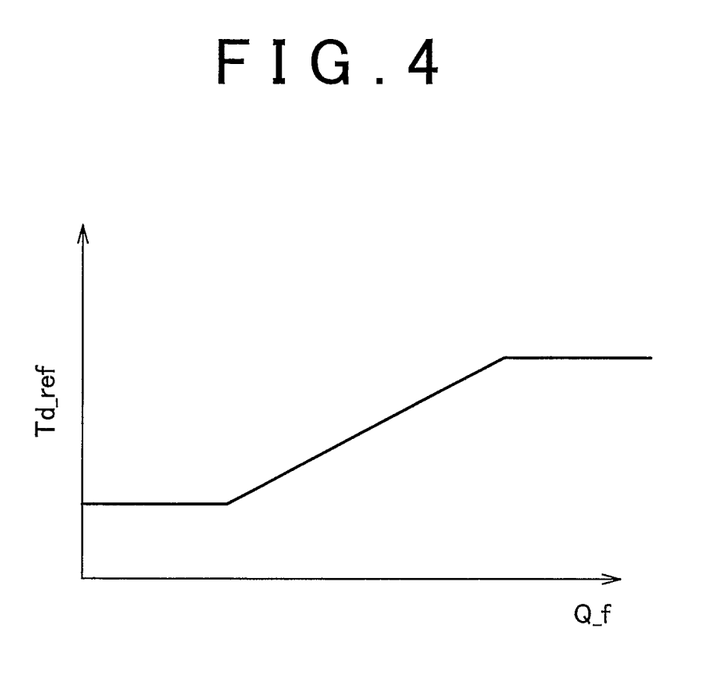
FIG. 4 is a graph showing an example of the relationship between the required pre-reformed fuel amount and the temperature difference limit.

FIG. 4 shows an example of the relationship between the required pre-reformed fuel amount Q_f and the temperature difference limit Td_ref. In FIG. 4, the horizontal axis represents the required pre-reformed fuel amount Q_f and the vertical axis represents the temperature difference limit Td_ref. For example, as shown in FIG. 4, the temperature difference limit Td_ref may exhibit a constant value until the required pre-reformed fuel amount Q_f increases to a prescribed required pre-reformed fuel amount Q_f, after which as the required pre-reformed fuel amount Q_f increases further, the temperature difference limit Td_ref increases in proportion to the required pre-reformed fuel amount Q_f. Then, the temperature difference limit Td_ref remains constant again after the required pre-reformed fuel amount Q_f exceeds a prescribed value.

If the difference between the detected temperature T2 and the detected temperature T1 exceeds the temperature difference limit Td_ref, the controller 10 performs control of various parts in the fuel cell system 100 to make the temperature distribution width inside the combustor 52 small. First, the controller 10 controls the air pump 80 to increase the air excess ratio λ, resulting in promotion of the combustion of methane in the combustor 52. By doing this, insufficient heat because of incomplete combustion in the combustor 52 may be avoided. Also, in this embodiment, because air is supplied to the combustor 52 via the cooling unit 63, the amount of air supplied to the combustor 52 might be different from the amount of air supplied to the cooling unit 63. A bypass valve or the like (not illustrated) may therefore be used as necessary to correct the amount of air supplied to the combustor 52.

The controller 10 may control the air pump 80 so that the air excess ratio λ is larger, as the difference between the detected temperature T2 and the detected temperature T1 is larger. In this case, methane is combusted with good efficiency. By doing this, insufficient heat because of incomplete combustion in the combustor 52 is efficiently avoided. The air excess ratio λ is preferably in the range from approximately 3 to 4.

If the air excess ratio λ reaches a prescribed value, the controller 10 controls the air pump 80 to stop the increase in the air excess ratio λ. This is because when the amount of air at a relatively low temperature is excessive, the temperature of the combustor 52 decreases. This prescribed value is referred to as the maximum excess ratio λref_u. When the air excess ratio λ reaches or exceeds the maximum excess ratio λref_u, the controller 10 controls the air pump 70 to reduce the amount of air supplied to the cathode 61. In this case, the amount of electricity generated in the fuel cell 60 decreases. By doing this, the amount of hydrogen consumed in the fuel cell 60 is reduced, and therefore the amount of hydrogen contained in the anode off-gas increases. Because hydrogen is easily combusted, combustion in the combustor 52 is promoted. From the above, sufficient heat can be supplied. Also, the amount of hydrogen consumed in the fuel cell 60 may be reduced by reducing the electrical load placed on the fuel cell 60.

The controller 10 may control the air pump 70 to reduce the amount of air supplied to the cathode 61, as the difference between the detected temperature T2 and the detected temperature T1 is larger. In this case, the amount of hydrogen supplied to the combustor 52 increases. By doing this, the combustion in the combustor 52 is promoted. As a result, sufficient heat can be efficiently provided.

When the difference between the detected temperature T2 and the detected temperature T1 is smaller than the temperature difference limit Td_ref, the controller 10 may control the air pump 80 to reduce the air excess ratio λ. In this case, the amount of air supplied to the combustor 52 decreases. By doing this, the amount of nitrogen at a relatively low temperature that does not contribute to the combustion is reduced, resulting in an improvement in the combustion efficiency in the combustor 52.

The controller 10 may stop control of the combustion component ratio in the combustor 52 if the minimum temperature in the combustor 52 is equal to or greater than a prescribed value. This is because if the minimum temperature in the combustor 52 is relatively high, there will be sufficient heat in the reforming unit 51. Doing this avoids performing unnecessary control. The prescribed temperature may be determined, for example, based on the amount of pre-reformed fuel supplied to the reforming unit 51. In this embodiment, the detected temperature T1 detected by the first temperature sensor 53 may be used as the minimum temperature in the combustor 52.

When the amount of anode off-gas supplied to the combustor 52 is small, the controller 10 may stop the control of the combustion component ratio in the combustor 52. This is to avoid unnecessary control because, if the amount of anode off-gas is small, a temperature distribution may occur regardless of the methane ratio in the anode off-gas. This embodiment determines whether the amount of anode off-gas supplied to the combustor 52 is small, based on the amount of pre-reformed fuel supplied to the reforming unit 51 by the amount-adjustment valve 40 and the amount of electricity generated by the fuel cell 60. For example, the controller 10 may determine that the amount of anode off-gas supplied is small if the expected electrical generation efficiency is greater than the electrical generation efficiency determined from the amount of pre-reformed fuel and the generated electrical power.

Figure 5:
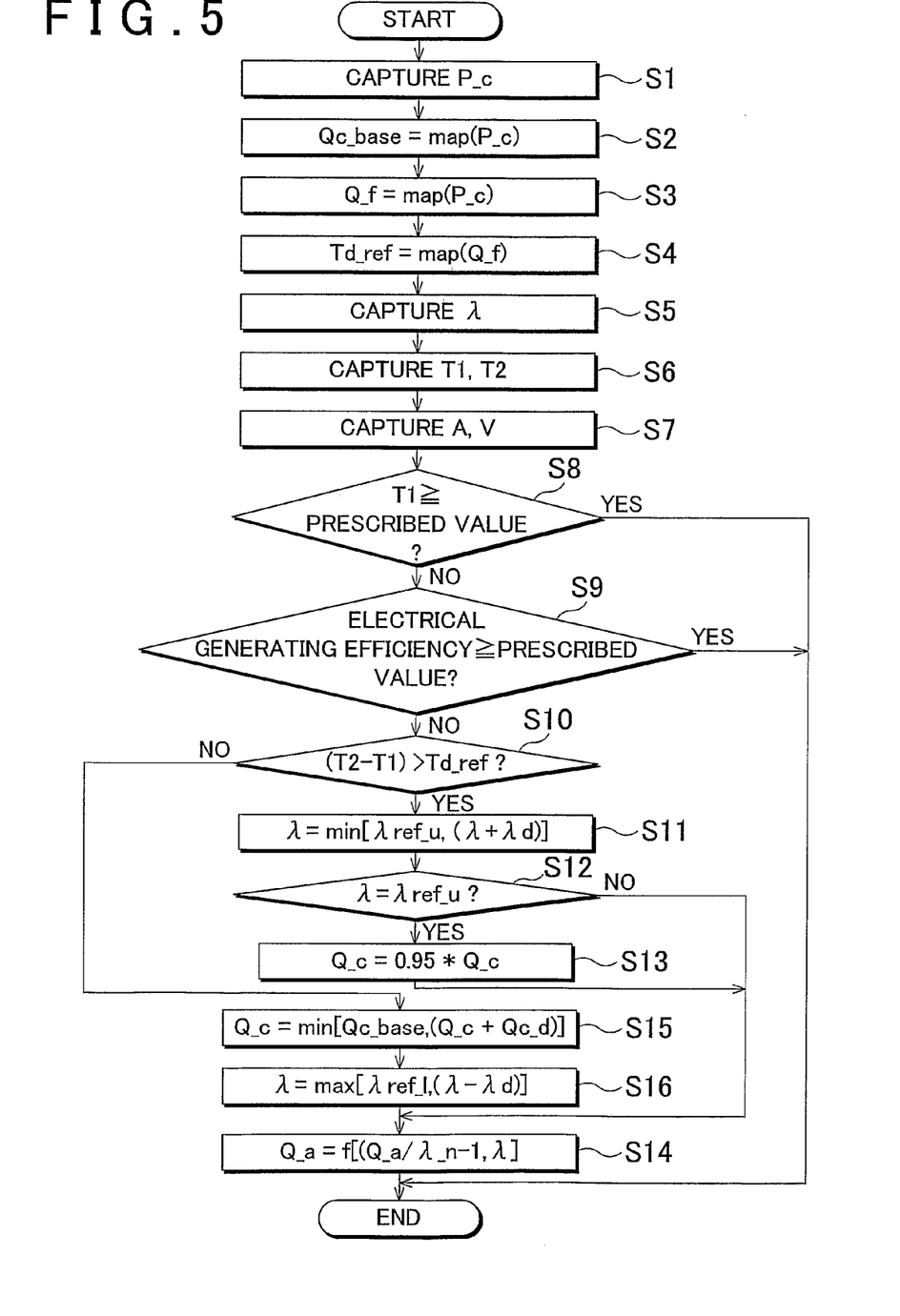
FIG. 5 is a flowchart showing an example of the control process by the controller of the combustion component ratio.

Next, an example of the control of the combustion component ratio by the controller 10 will be described. FIG. 5 is a flowchart showing an example of this control process. The controller 10 executes the processing shown in the flowchart of FIG. 5 with a prescribed time period after power is switched on. The controller 10 is switched on by a starter switch, for example. The starter switch may be a manual switch, or may alternatively be a timer type of switch. From the standpoint of, for example, the response of the temperature sensors, it is preferable that the execution time period be short. Because a temperature sensor generally has a response in the order of 100 ms, in this embodiment the controller 10 executes the processing in the flowchart of FIG. 5 with a time period of 512 ms.

As shown in FIG. 5, the controller 10 determines the power command value P_c (step S1). The power command value P_c is determined, for example, from an accelerator opening. Next, the controller 10 determines the required air amount Qc_base, based on the power command value P_c (step S2). In this case, it determines the required air amount Qc_base by using the map shown in FIG. 2. Next, the controller 10 determines the required pre-reformed fuel amount Q_f, based on the power command value P_c (step S3). In this case, the controller 10 determines the required pre-reformed fuel amount Q_f by using the map shown in FIG. 3.

Next, the controller 10 determines the temperature difference limit Td_ref, based on the required pre-reformed fuel amount Q_f (step S4). In this case, the controller 10 determines the temperature difference limit Td_ref by using the map shown in FIG. 4. Next, the controller 10 acquires the air excess ratio λ from the air excess ratio λ sensor 55 (step S5). Then, the controller 10 acquires the detected temperature T1 from the first temperature sensor 53 and acquires the detected temperature T2 from the second temperature sensor 54 (step S6). Next, the controller 10 acquires the generated voltage V from the voltmeter 64 and acquires the generated current A from the ammeter 65 (step S7).

Next, the controller 10 determines whether the detected temperature T1 is at least a prescribed value (step S8). If it is determined at step S8 that the detected temperature T1 is at least the prescribed temperature, the controller 10 ends the processing shown in the flowchart. The prescribed value in step S8 is a temperature at which insufficient heat does not occur in the reforming unit 51. By doing this, unnecessary execution of the processing shown in the flowchart is avoided.

If it is determined at step S8 that the detected temperature T1 was below the prescribed value, the controller 10 then determines whether the electrical generation efficiency of the fuel cell 60 is equal to or greater than a prescribed value (step S9). The electrical generation efficiency of the fuel cell 60 may be determined from the generated voltage V, the generated current A, and the required pre-reformed fuel amount Q_f determined on the previous cycle of execution of the processing shown in the flowchart. If it is determined at step S9 that the electrical generation efficiency of temperature fuel cell 60 is equal to or greater than the prescribed value, the controller 10 ends the processing shown in the flowchart, thereby avoiding unnecessary execution of the processing shown in the flowchart.

If it is determined at step S9 that the electrical generation efficiency of the fuel cell 60 is below the prescribed value, the controller 10 then determines whether the difference between the detected temperature T2 and the detected temperature T1 exceeds the temperature difference limit Td_ref (step S10). If it is determined at step S10 that the difference between the detected temperature T2 and the detected temperature T1 exceeds the temperature difference limit Td_ref, the controller 10 sets the air excess ratio λ to the smaller of the maximum excess ratio λref_u and the air excess ratio λ+λd (step S11). In this embodiment, λd is, for example, approximately 0.2. By the execution of step S11, the air excess ratio λ increases, thereby promoting combustion in the combustor 52.

Next, the controller 10 determines whether the air excess ratio λ is equal to the maximum air excess ratio λref_u (step S12). If it is determined at step S12 that the air excess ratio λ is equal to the maximum air excess ratio λref_u, the controller 10 reduces the air amount Q_c supplied to the cathode 61 by 5% (step S13), thereby reducing the electricity generated by the fuel cell 60. As a result, the amount of hydrogen in the anode off-gas increases. The reason the absolute unit is not used to reduce the amount of air supplied to the cathode 61 at step S13 is to avoid a sudden change in the amount of air supplied to the cathode 61. At step S12 at determination may be made as to whether the air excess ratio λ is equal to or greater than the maximum air excess ratio λref_u.

Next, the controller 10 determines the air amount Q_a to be supplied to the cooling unit 63, from the value obtained by dividing air amount Q_a supplied to the cooling unit 63 from the air pump 80 by the air excess ratio λ_n−1 at the immediately previous time the processing of the flowchart was executed, and from the current air excess ratio λ (step S14). If, at step S12, it is not determined that the air excess ratio λ is equal to the maximum excess ratio λref_u, the controller 10 executes step S14 without executing step S13. By doing this, combustion in the combustor 52 is promoted without reducing the amount of electricity generated in the fuel cell 60. After that, the controller 10 ends the processing shown in the flowchart.

If, at step S10, it is not determined that the difference between the detected temperature T2 and the detected temperature T1 exceeds the temperature difference limit Td_ref, the controller 10 sets the air amount Q_c to be supplied to the cathode 61 to the smaller of the required air amount Qc_base and the sum of the air amount Q_c currently being supplied to the cathode 61 and Qc_d (step S15). In this case, Qc_d is preferably made as small as possible beyond the control resolution of the air pump 70. This is because when the amount of air supplied to the cathode 61 increases suddenly, there could be a sudden broadening of the temperature distribution width in the combustor 52.

Next, the controller 10 sets the air excess ratio λ to the larger of the minimum excess ratio λref_1 and the air excess ratio λ minus λd (step S16). In this case, the air excess ratio λ decreases, and as a result the amount of air supplied to the combustor 52 is reduced. As a result, the decrease in the temperature of the combustor 52 is suppressed. The minimum excess ratio λref_1 is theoretically 1. However, it is difficult to use all of the oxygen supplied to the combustor 52. In this embodiment, therefore, the minimum excess ratio λref_1 is set to approximately 1.2. The value of % d is preferably made as small as possible beyond the control resolution of the air pump 80, for example, approximately 0.05. After the above, step S14 is executed.

By execution of the processing shown in the flowchart of FIG. 5 as described above, the combustion component ratio in the combustor 52 is controlled. By doing this, combustion in combustor 52 is promoted. As a result, sufficient heat is provided in reforming unit 51, and unnecessary execution of the processing shown in the flowchart of FIG. 5 is avoided.

Although this embodiment acquires (measures, predicts) the difference between temperatures detected by two temperature sensors as the temperature distribution width, and takes the temperature distribution width as the temperature distribution of the combustor 52, the temperature distribution of the combustor 52 is not restricted to the temperature distribution width. For example, by using more temperature sensors, the temperature distribution of the combustor 52 is acquired (predicted or measured) with better accuracy.

In this embodiment, the following elements can be treated as being related to the constituent elements of the invention as follows. Specifically, the anode off-gas and air may correspond to the combustion component, the oxygen contained in the air may correspond to the combustion-supporting gas, the methane may correspond to the difficult-to-combust gas, the first temperature sensor 53 and the second temperature sensor 54 may correspond to the temperature distribution width acquisition unit, the controller 10 may correspond to the ratio controller, the pre-reformed fuel amount acquisition unit, the first determining unit and the second determining unit, the air excess ratio λ sensor 55 may correspond to the combustion-supporting gas ratio acquisition unit, and the first temperature sensor 53 may correspond to the minimum temperature acquisition unit.

A fuel cell system 100*a* according to the second embodiment of the present invention will next be described. The fuel cell system 100*a* differs from the fuel cell system 100 with regard to the control process performed by the controller 10. The control of the combustion component ratio in the combustor 52 based on the temperature distribution in the combustor 52 is described below.

Figure 6:
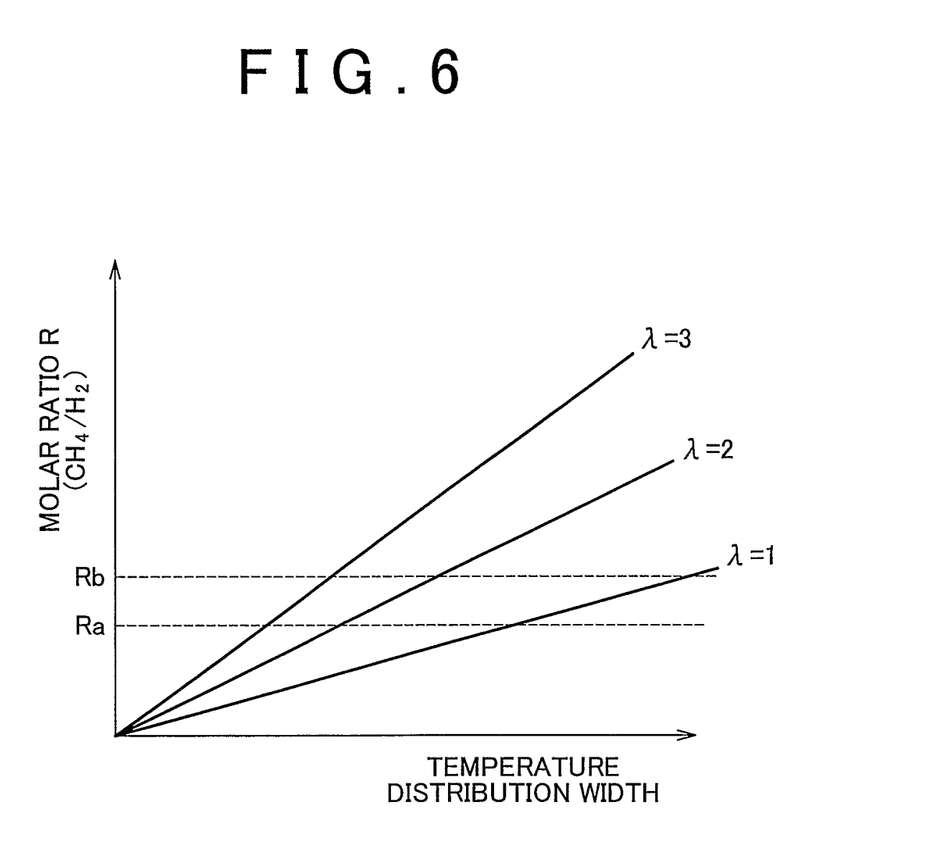
FIG. 6 is a graph showing an example of the relationship between the temperature distribution width, the molar ratio R, and the excess air ratio $\lambda$ in the combustor.

The controller 10 determines the molar ratio R, which is the ratio of the number of moles of hydrogen in the anode off-gas to the number of moles of methane in the anode off-gas, based on the temperature distribution width in the direction of gas flow in the combustor 52 and on the air excess ratio λ using, for example, a map such as shown in FIG. 6. FIG. 6 shows an example of the relationship between the temperature distribution width of the combustor 52, the molar ratio R, and the air excess ratio λ, in which the horizontal axis represents the temperature distribution width in the combustor 52, and the vertical axis represents the molar ratio R. In this embodiment, the temperature difference between the detected temperature T2 and the detected temperature T1 is used as the temperature distribution width of the combustor 52.

As shown in FIG. 6, the molar ratio R increases with an increase in the temperature distribution width. The rate of increase of the molar ratio R becomes larger, as the air excess ratio λ increases. The controller 10 determines the molar ratio R based on, for example, the detection results from the first temperature sensor 53, the second temperature sensor 54, and the air excess ratio λ sensor 55.

Next, the controller 10 determines whether the molar ratio R is equal to or greater than a first prescribed value Ra. The first prescribed value Ra is, for example, approximately 0.2. The molar ratio R exceeding the first prescribed value Ra indicates that the methane ratio in the anode off-gas is high. In this case, the controller 10 controls the various parts of the fuel cell system 100*a* to promote combustion of the methane. First, the controller 10 controls the air pump 80 to increase the air excess ratio λ, thereby promoting combustion of the methane in the combustor 52 to avoid insufficient heat due to incomplete combustion in the combustor 52.

The controller 10 may control the air pump 80 to make the air excess ratio λ larger, as the molar ratio R is larger. In this case, the methane is combusted with good efficiency. By doing this, sufficient heat may be efficiently provided. The air excess ratio λ is preferably in the range from approximately 3 to 4.

In the case in which the molar ratio R is equal to or greater than the second prescribed value Rb, the controller 10 controls the air pump 80 to stop the increase of the air excess ratio λ. This is because the temperature of the combustor 52 decreases when the amount of air at a relatively low temperature becomes excessive. The second prescribed value Rb is set larger than the first prescribed value Ra, for example, approximately 0.5. Next, the controller 10 controls the air pump 70 to decrease the air amount supplied to the cathode 61. In this case, the amount of electricity generated by the fuel cell 60 decreases, resulting in an increase of the hydrogen amount included in the anode off-gas. As a result, combustion is promoted in the combustor 52. The above may avoid insufficient heat.

The controller 10 may control the air pump 70 so that the air amount supplied to the cathode 61 is reduced, as the molar ratio R is larger. In this case, the amount of hydrogen supplied to the combustor 52 increases, thereby promoting combustion in the combustor 52. As a result, sufficient heat may be efficiently provided.

If the molar ratio R is lower than the first prescribed value Ra, the air pump 80 may be controlled to decrease the air excess ratio $\lambda$. In this case, the amount of air supplied to the combustor 52 decreases, thereby decreasing the relatively low-temperature nitrogen amount that does not contribute to combustion. As a result, the combustion efficiency in the combustor 52 is improved.

The first prescribed value Ra and the second prescribed value Rb may be varied based on the average temperature in the combustor 52. For example, the first prescribed value Ra and the second prescribed value Rb may be higher, as the average temperature in the combustor 52 increases. This is because, if the average temperature in the combustor 52 is high, it is possible to provide sufficient heat to the reforming unit 51 without controlling the air excess ratio $\lambda$ and the hydrogen amount. The average temperature may be the average value of the temperatures detected by the first temperature sensor 53 and the second temperature sensor 54, for example.

Figure 7:
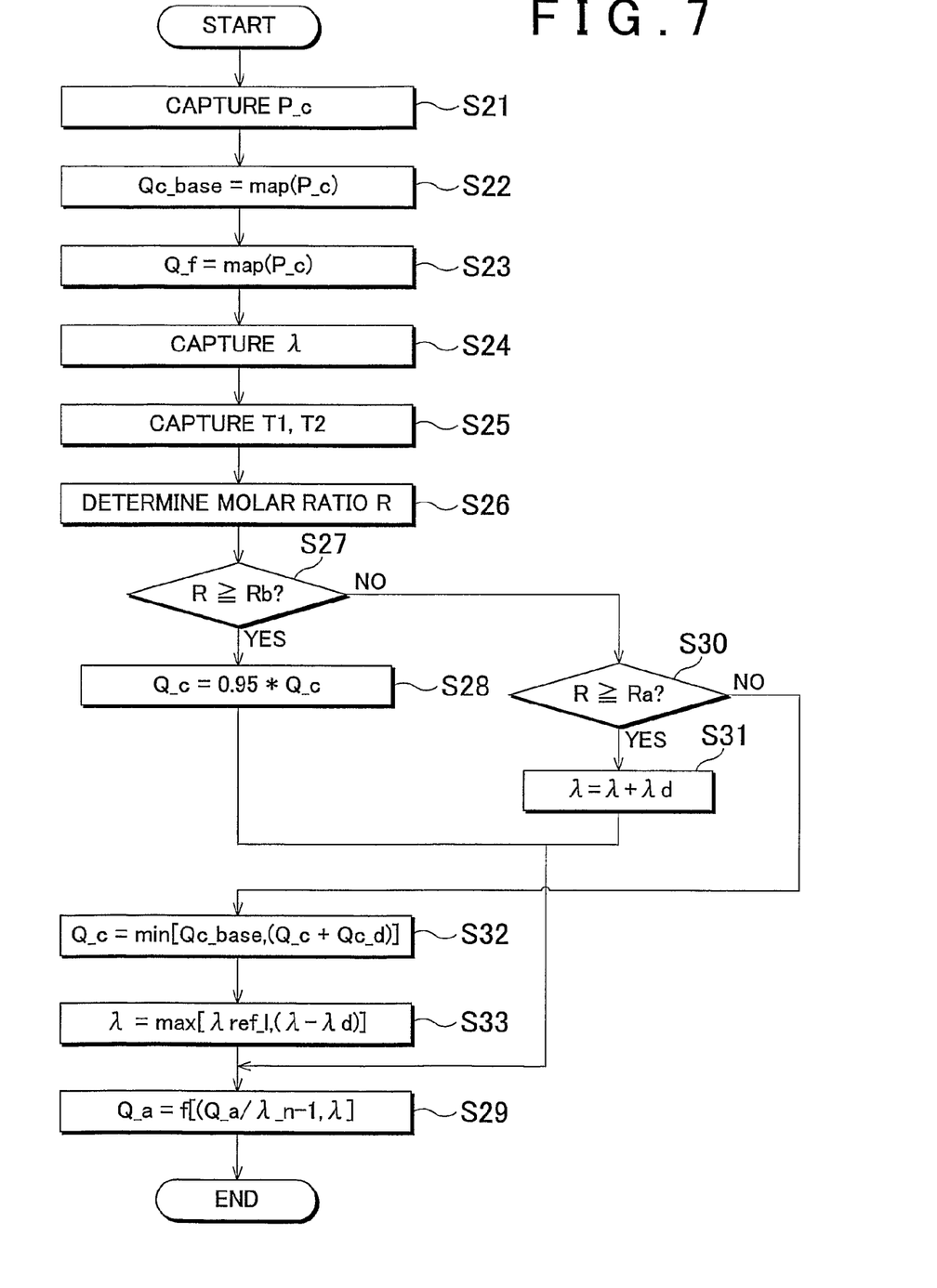
FIG. 7 is a flowchart showing an example of the control process by the controller of the combustion component ratio.

An example of the control process of the combustion component ratio by the controller 10 according to the second embodiment will now be described. FIG. 7 is a flowchart showing an example of the above-noted control process. As shown in FIG. 7, the controller 10 determines the power command value P_c (step S21). The power command value P_c is determined, for example, from the accelerator opening. Next, the controller 10 may determine the required air amount Qc_base, based on the power command value P_c (step S22). In this case, it determines the required air amount Qc_base by using, for example, the map shown in FIG. 2.

Next, the controller 10 determines the required pre-reformed fuel amount Q_f, based on the power command value P_c (step S23). In this case, the controller 10 may determine the required pre-reformed fuel amount Q_f by using, for example, the map shown in FIG. 3. Next, the controller 10 acquires the air excess ratio $\lambda$ from the air excess ratio $\lambda$ sensor 55 (step S24). Then, the controller 10 acquires the detected temperature T1 from the first temperature sensor 53 and acquires the detected temperature T2 from the second temperature sensor 54 (step S25).

Next, the controller 10 determines the molar ratio R, based on the difference between the detected temperature T2 and the detected temperature T1, and on the air excess ratio $\lambda$ (step S26) using, for example, a map such as shown in FIG. 6. Next, the controller 10 determines whether the molar ratio R is equal to or greater than the second prescribed value Rb (step S27). If it is determined at step S27 that the molar ratio R is equal to or greater than the second prescribed value Rb, the controller 10 reduces the air amount Q_c supplied to the cathode 61 by 5% (step S28). As a result, the amount of hydrogen in the anode off-gas increases.

Next, the controller 10 determines the air amount Q_a to be supplied to the cooling unit 63, from the value obtained by dividing air amount Q_a supplied to the cooling unit 63 from the air pump 80 by the air excess ratio $\lambda$_n−1 at the immediately previous time the processing of the flowchart was executed, and from the current air excess ratio $\lambda$ (step S29). After the above, the controller 10 ends the processing shown in the flowchart.

If it is determined at step S27 that the molar ratio R is less than the second prescribed value Rb, the controller 10 determines whether the molar ratio R is equal to or greater than the first prescribed value Ra (step S30). If it is determined at step S30 that the molar ratio R is equal to or greater than the first prescribed value Ra, the controller 10 sets the air excess ratio $\lambda$ to the air excess ratio $\lambda$+$\lambda$d (step S31). In this embodiment $\lambda$d is, for example, approximately 0.2. By execution of step S31, the air excess ratio $\lambda$ is increased, thereby promoting combustion in the combustor 52. After the above, the controller 10 executes step S29.

If it is determined at step S30 that the molar ratio R is less than the first prescribed value Ra, the controller 10 sets the air amount Q_c to be supplied to the cathode 61 to the smaller of the required air amount Qc_base and the sum of the air amount Q_c currently being supplied to the cathode 61 and Qc_d (step S32). In this case, Qc_d is preferably made as small as possible beyond the control resolution of the air pump 70. This is because when the amount of air supplied to the cathode 61 increases suddenly, there could be a sudden broadening of the temperature distribution width in the combustor 52.

Next, the controller 10 sets the air excess ratio $\lambda$ to the larger of the minimum excess ratio $\lambda$ref_1 and the air excess ratio $\lambda$ minus $\lambda$d (step S33). In this case, the air excess ratio $\lambda$ decreases, and as a result the amount of air supplied to the combustor 52 is reduced. As a result, the decrease in the temperature of the combustor 52 is suppressed. In this embodiment, the minimum excess ratio $\lambda$ref_1 is set to approximately 1.2. In step S33, the value of $\lambda$d may be made, for example, approximately 0.05. After the above, step S29 is executed.

By execution of the processing shown in the flowchart of FIG. 7 as described above, the combustion component ratio in the combustor 52 is controlled. By doing this, combustion in combustor 52 is promoted. As a result, sufficient heat can be provided in the reformer 51. Step S8 and step S9 of FIG. 5 may be incorporated into the flowchart of FIG. 7, thereby avoiding unnecessary execution.

Although it may be envisioned that the oxygen concentration of combustion exhaust gas from the combustor 52 is detected to control the combustion component ratio in the combustor 52, it is not possible to predict the ratios of methane and hydrogen from the oxygen concentration. Given this, it may be envisioned that a hydrogen sensor and a methane sensor are used to measure the ratios of methane and hydrogen in the anode off-gas. Because of interference by methane with the hydrogen sensor, however, it is difficult to accurately measure the hydrogen concentration in the anode off-gas that contains methane. Also, because the methane sensor is a combustion type of sensor, it is difficult to use with a gas such as the anode off-gas, in which there is a mixture including hydrogen.

In this embodiment, the following elements can be treated as being related to the constituent elements of the invention as follows. Specifically, the anode off-gas and air may correspond to the combustion component, the oxygen contained included in the air may correspond to the combustion-supporting gas, the methane may correspond to the difficult-to-combust gas, the first temperature sensor 53 and the second temperature sensor 54 may correspond to the temperature distribution width acquisition unit and the temperature acquisition unit, the controller 10 may correspond to the ratio controller, the determining unit, the pre-reformed fuel amount acquisition unit, the first determining unit, the second determining unit, and the component ratio predicting unit, the air excess ratio λ sensor 55 may correspond to the combustion-supporting gas ratio acquisition unit, the first temperature sensor 53 may correspond to the minimum temperature acquisition unit, the first prescribed value Ra may correspond to the first prescribed value, and the second prescribed value Rb may correspond to the second prescribed value.

While some embodiments of the invention have been illustrated above, it is to be understood that the invention is not limited to details of the illustrated embodiments, but may be embodied with various changes, modifications, or improvements, which may occur to those skilled in the art, without departing from the spirit and scope of the invention.

What is claimed is:

1. A fuel cell system comprising:
   a fuel cell;
   a reformer;
   a combustor that heats the reformer using anode off-gas of the fuel cell as a fuel;
   a temperature distribution width acquisition unit that acquires a temperature distribution width in a gas flow direction inside the combustor, the temperature distribution width being a temperature difference between an exhaust gas inlet side of the combustor and an exhaust gas outlet side; and
   a ratio controller programmed to control a ratio of a combustion component including the anode off-gas supplied to the combustor in accordance with the temperature distribution width in the gas flow direction inside the combustor.

2. The fuel cell system according to claim 1, wherein the ratio controller increases an amount of combustion-supporting gas supplied to the combustor, if a temperature distribution width in the gas flow direction inside the combustor exceeds a prescribed value.

3. The fuel cell system according to claim 1, wherein the ratio controller increases an amount of combustion-supporting gas supplied to the combustor, as a temperature distribution width in the gas flow direction inside the combustor is greater.

4. The fuel cell system according to claim 2, wherein the ratio controller increases an amount of hydrogen in the anode off-gas, if an excess oxygen ratio in the combustor exceeds a prescribed rate.

5. The fuel cell system according to claim 2, wherein the ratio controller increases an amount of hydrogen in the anode off-gas, as the temperature distribution width in the gas flow direction inside the combustor is greater.

6. The fuel cell system according to claim 1, further comprising a component ratio prediction unit that predicts a component ratio in the anode off-gas based on the temperature distribution width acquired by the temperature distribution width acquisition unit,
   wherein the ratio controller controls the ratio of the combustion component based on the component ratio predicted by the component ratio prediction unit.

7. The fuel cell system according to claim 6, wherein
   the anode off-gas includes a difficult-to-combust gas;
   the component ratio prediction unit predicts a ratio of the difficult-to combust gas in the anode off-gas; and
   the ratio controller increases the amount of combustion-supporting gas, if the ratio of the difficult-to-combust gas that is predicted by the component ratio prediction unit is equal to or exceeds a first prescribed value.

8. The fuel cell system according to claim 7, wherein the ratio controller reduces the consumed hydrogen amount of the fuel cell, if the ratio of the difficult-to-combust gas that is predicted by the component ratio prediction unit is equal to or exceeds a second prescribed value that is greater than the first prescribed value.

9. The fuel cell system according to claim 8, further comprising:
   a temperature acquisition unit that acquires an average temperature in the combustor; and
   a determining unit that determines the first prescribed value and the second prescribed value based on the average temperature that is acquired by the temperature acquisition unit.

10. The fuel cell system according to claim 2, further comprising
    a combustion-supporting gas ratio acquisition unit that acquires a ratio of the anode off-gas and the combustion-supporting gas,
    wherein the ratio controller controls the ratio of the combustion component based on the ratio of the anode off-gas and the combustion-supporting gas that is acquired by the combustion-supporting gas ratio acquisition unit.

11. The fuel cell system according to claim 1, further comprising
    a minimum temperature acquisition unit that acquires a minimum temperature of the combustor; and
    a first determining unit that determines whether to operate the ratio controller, based on the minimum temperature acquired by the minimum temperature acquisition unit.

12. The fuel cell system according to claim 1, further comprising
    a pre-reformed fuel amount acquisition unit that acquires a pre-reformed fuel amount supplied to the reformer; and
    a second determining unit that determines whether to operate the ratio controller, based on the pre-reformed fuel amount acquired by the pre-reformed fuel amount acquisition unit.

13. The fuel cell system according to claim 1, further comprising
    a pump supplying air to the fuel cell,
    wherein the ratio controller controls that ratio of the combustion component by adjusting air amount that is supplied to the fuel cell from the pump.

14. The fuel cell system according to claim 1, wherein the temperature distribution width acquisition unit includes a first temperature sensor provided in the vicinity of a catalyst inlet of the combustor, and a second temperature sensor provided in the vicinity of a catalyst outlet of the combustor, and wherein the temperature distribution width is a difference between the temperature acquired by the first temperature sensor and the temperature acquired by the second temperature sensor.

15. The fuel cell system according to claim 1, further comprising:
    an air pump that supplies air as a combustion-supporting gas to the combustor,
    wherein the ratio controller controls the ratio of the combustion component by adjusting an amount of combustion-supporting gas supplied by the air pump.

16. The fuel cell system according to claim 7, wherein the difficult-to-combust gas is methane.

17. A fuel cell system comprising:
    a fuel cell;
    a reformer;

a combustor that heats the reformer with anode off-gas of the fuel cell as a fuel, said anode off-gas including an easily combusted gas and a difficult-to-combust gas;

a temperature distribution width acquisition unit that acquires a temperature distribution width in a gas flow direction inside the combustor, the temperature distribution width being a temperature difference between an exhaust gas inlet side of the combustor and an exhaust gas outlet side;

a component ratio prediction unit programmed to predict a ratio of the difficult-to-combust gas in the anode off-gas based on the temperature distribution width acquired by the temperature distribution width acquisition unit; and a ratio controller programmed to control a ratio of the anode-off gas and a combustion-supporting gas supplied to the combustor based on the ratio of the difficult-to-combust gas predicted by the component ratio prediction unit.

18. The fuel cell system according to claim 2, wherein the prescribed value corresponds to a temperature difference at which incomplete combustion occurs in the combustor.

* * * * *